United States Patent [19]
Pekosh

[11] 4,069,354
[45] Jan. 17, 1978

[54] METHOD FOR DISPENSING CEMENT ONTO THE SEAL LAND OF A COLOR CRT FUNNEL

[75] Inventor: Raymond J. Pekosh, Niles, Ill.

[73] Assignee: Zenith Radio Corporation, Glenview, Ill.

[21] Appl. No.: 640,802

[22] Filed: Dec. 15, 1975

[51] Int. Cl.[2] .................... C03C 17/00; C03C 17/04

[52] U.S. Cl. .................................... 427/64; 118/6; 118/318; 118/320; 156/89; 313/405; 427/72; 427/105; 427/106; 427/108; 427/231; 427/279; 427/284; 427/287

[58] Field of Search .................... 427/58, 64, 72, 231, 427/284, 105, 106, 287, 108, 110, 279; 313/405; 118/320, 318, 6; 156/89

[56] References Cited

U.S. PATENT DOCUMENTS

| | | | |
|---|---|---|---|
| 2,880,697 | 4/1959 | Blanding | 118/320 |
| 3,339,522 | 9/1967 | Shaffer | 118/320 |
| 3,403,658 | 10/1968 | Damm et al. | 118/6 |
| 3,492,146 | 1/1970 | Kornaker | 427/284 |
| 3,894,260 | 7/1975 | Sediuy | 313/405 |

*Primary Examiner*—Ralph S. Kendall
*Assistant Examiner*—John D. Smith
*Attorney, Agent, or Firm*—John R. Garrett

[57] ABSTRACT

This disclosure depicts a novel method for dispensing a cement onto the seal land of a color CRT funnel. In particular, this method is intended for dispensing cement onto a funnel seal land which defines a convex curved plane, at least a curved segment of the seal land lying on a predetermined radius. The method comprises holding the funnel in a neck-down position, providing a substantially stationary cement dispensing nozzle and, in order to dispense cement on at least the segment of the curved seal land, swinging the funnel about the origin of the radius of the seal land segment such that the seal land segment passes under the cement dispensing nozzle at a substantially constant predetermined distance beneath the nozzle and in a substantially horizontal attitude. Apparatus is disclosed for implementing the described method.

4 Claims, 10 Drawing Figures

METHOD FOR DISPENSING CEMENT ONTO THE SEAL LAND OF A COLOR CRT FUNNEL

BACKGROUND OF THE INVENTION

This invention relates in general to the manufacture of color television picture tubes, and in particular to a method for dispensing frit material onto the seal land of a glass funnel constituting part of a color CRT bulb.

Conventional color CRT bulbs are fabricated in two parts, a funnel and a faceplate. The funnel and faceplate have seal lands which are joined together to form a hermetic seal. Conventionally, the funnel has a flat seal land (i.e., the seal land lies in a flat plane which is perpendicular to the axis of the funnel. The conventional faceplate is curved and has a flange with a flat seal land which matches the seal land of the funnel. The funnel and faceplate are joined by means of a frit material (a devitrifying solder glass cement - sometimes termed hereinafter simply a "frit") which is applied to the seal land of the funnel.

Apparatus used to dispense the frit material onto the funnel seal land typically holds the funnel in a vertical, neck-down position. A nozzle which dispenses the frit material moves around the glass funnel above the seal land and applied the frit material to the seal land. It is necessary that the seal land under a frit dispensing nozzle be in a horizontal plane so that the frit material will not run off until enough time has elapsed for the frit material to set up. Another type of apparatus is known wherein the nozzle is fixed and the funnel is rotated and translated in the plane of the seal land under the nozzle.

This invention is believed to be most useful when applied to a tube having a flangeless faceplate. Such a tube is disclosed in U.S. Pat. No. 3,894,260, issued to the assignee of this application. The tube has a flangeless, curved glass faceplate, a concave inner surface of which receives a phosphor screen. The funnel portion of this unique tube has a convex curved seal land (that is, the seal land defines a convex curved plane) which matches and mates with the curvature of the concave inner surface of the faceplate. Since the faceplate is flangeless, the sealing interface between the funnel and faceplate is curved rather than planar as in conventional tubes.

To adapt prior art frit-applying apparatus to apply frit to this type of glass funnel, the nozzle would have to be given an up and down motion as the funnel seal land is transversed. Apparatus capable of such movement would be very complex and precise (and therefore expensive) to insure that the frit material is applied evenly and in the center of the seal land. In such an adaptation of prior art apparatus, the seal land would not be in a horizontal plane when the tube is mounted in the vertical position. The frit material (as presently constituted) is not sufficiently viscous to prevent run-off from the seal land.

OBJECTS OF THE INVENTION

It is an object of the invention to provide an improved method for dispensing frit material onto the seal land of a color television picture tube funnel of a type in which the seal land, or segments thereof, defines a curved plane.

It is another object of this invention to provide an improved method for accurately and efficiently dispensing frit material to the seal land of such a color CRT funnel in such a way that frit run-off is suppressed.

It is yet another object to provide an improved frit dispensing apparatus having a nozzle which is held in position substantially over the center of the seal land.

It is still another object to provide an improved frit dispensing apparatus which adjustable for quickly and efficiently adapting to different size funnels.

It is an object to drastically reduce, in the manufacture of color cathode ray tubes, rejects in finished tubes which are related to frit run-off, and thus effect substantial economies in tube manufacture.

DESCRIPTION OF THE PREFERRED EMBODIMENT

This invention pertains to a method for dispensing a cement onto a seal land of a glass funnel to be used as a component of a color television picture tube. The color television picture tube to which this invention is applied includes a faceplate and a mating funnel; the funnel has a seal land defining a convex three-dimensionally curved plane wherein at least one curved segment of the funnel seal land lies on a predetermined radius.

The basic concept of the novel method will now be described. The method for dispensing a cement onto a curved segment of the seal land of the funnel comprises: holding the funnel such that a section of the curved seal land segment is substantially horizontal and upwardly facing, thus preventing cement run-off (the cement will set up quickly, but must be applied to a substantially horizontal surface); providing a substantially stationary cement dispensing nozzle in position over the horizontal section of the seal land segment for applying a cement to the seal land; and, in order to dispense the cement on the entirety of the segment, swinging the funnel on an axis which is transverse to a central axis of the funnel and which passes substantially through the origin of the radius of the seal land segment of the funnel. As a result, the segment passes under the cement dispensing nozzle at a substantially constant predetermined distance beneath the nozzle and in a substantially horizontal attitude.

Figure 1:
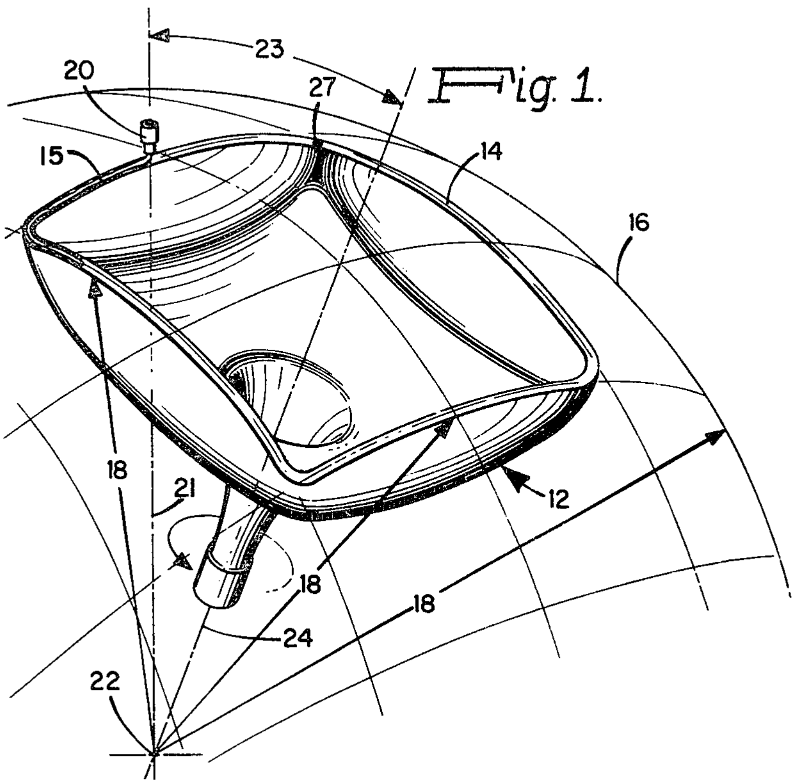
FIG. 1 is a perspective view of a unique glass funnel for use in a color cathode ray tube, the funnel has a spherical, or approximately spherical funnel seal land.

Whereas the invention may be implemented for use in television picture tubes of various types, it is preferably used in the manufacture of a tube with a funnel of the nature shown in FIG. 1. The funnel 12 (to be described in more detail hereinafter) has a convex seal land 14 herein intended to mean a seal land which defines an imaginary convex curved surface, which surface curvature may by spherical, multi-radial, cylindrical or of other suitable curved configuration. The faceplate (not shown) which mates with this funnel is contemplated to have a flangeless dished configuration, which may be spherical, multi-radial, cylindrical or of other suitable curvature. Such a tube is disclosed in Pat. No. 3,894,260, issued to the assignee of this application. The seal land of the funnel is hermetically bonded to the seal land of the faceplate, heretaken to be the rear surface of a flangeless faceplate, by a divitrifying glass solder or frit material (hereinafter termed a cement 15), along a sealing interface.

The funnel 12, as illustrated in FIG. 1, has a seal land 14 which defines a convex, three-dimensionally curved plane. For this particular funnel the curved plane is an imaginary sphere 16. The resulting seal land 14 is higher at the sides than at the corners of the funnel 12. Also, all area of the seal land 14 are at an equal distance 18 from the center 22 of the sphere 16. Also, it should be noted that the seal land 14 necessarily has a sloping surface with reference to a central axis 24 of the funnel 12.

For efficiency and economy in the manufacture of color television tubes, it is desirable that the cement dispensing nozzle 20 remain substantially stationary and in a substantially fixed position with reference to the center 22 of the sphere 16. Therefore, the necessary relative movement between funnel and nozzle must be accomplished by movement of the funnel 12. By this invention the apparatus necessary to produce the required complex movement of the funnel 12 is surprisingly simple. Before the novel apparatus is described, the complex motion of the funnel will be explained. Two components of motion are required to move the funnel 12 such that the seal land 14 passes beneath the cement dispensing nozzle 20 at a substantially constant predetermined separation distance and in a substantially horizontal attitude. In the case of a funnel having a seal land which is spherical or approximately spherical, this is accomplished by revolving the funnel 12 about its central axis 24 while simultaneously swinging the funnel back and forth about a pivot axis which passes through the center 22 of the sphere 16 and which is transverse to the central axis 24. The first component of motion, the swinging of the funnel 12, must be synchronized with the second components of motion, the rotation of the funnel 12, such that as a corner of the funnel 12 approaches the cement dispensing nozzle 20, the axis 24 of the funnel 12 will swing away from the nozzle 20, thereby keeping the seal land 14 under the nozzle 20; as the side of the funnel 12 approaches the nozzle 20, the funnel axis 24 will swing back toward the nozzle 20.

FIGS. 2A–2E and 3 further illustrate the novel movement of the funnel 12 according to this invention.

Figure 3:
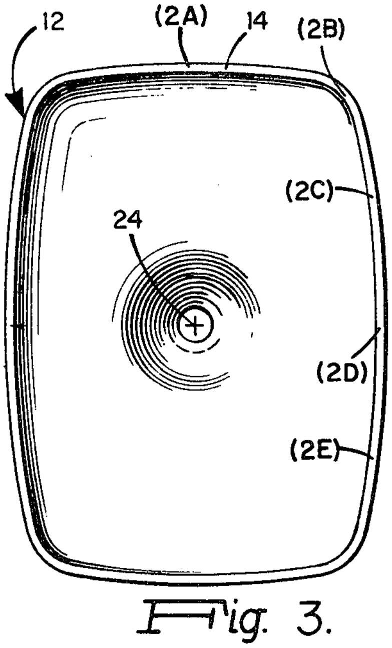
FIG. 3 is a plane view of the FIG. 1 funnel, indicating positions of the cement dispensing nozzle corresponding to the rotated and tilted positions of the funnel indicated in FIGS. 2A-2E.
Figure 2:
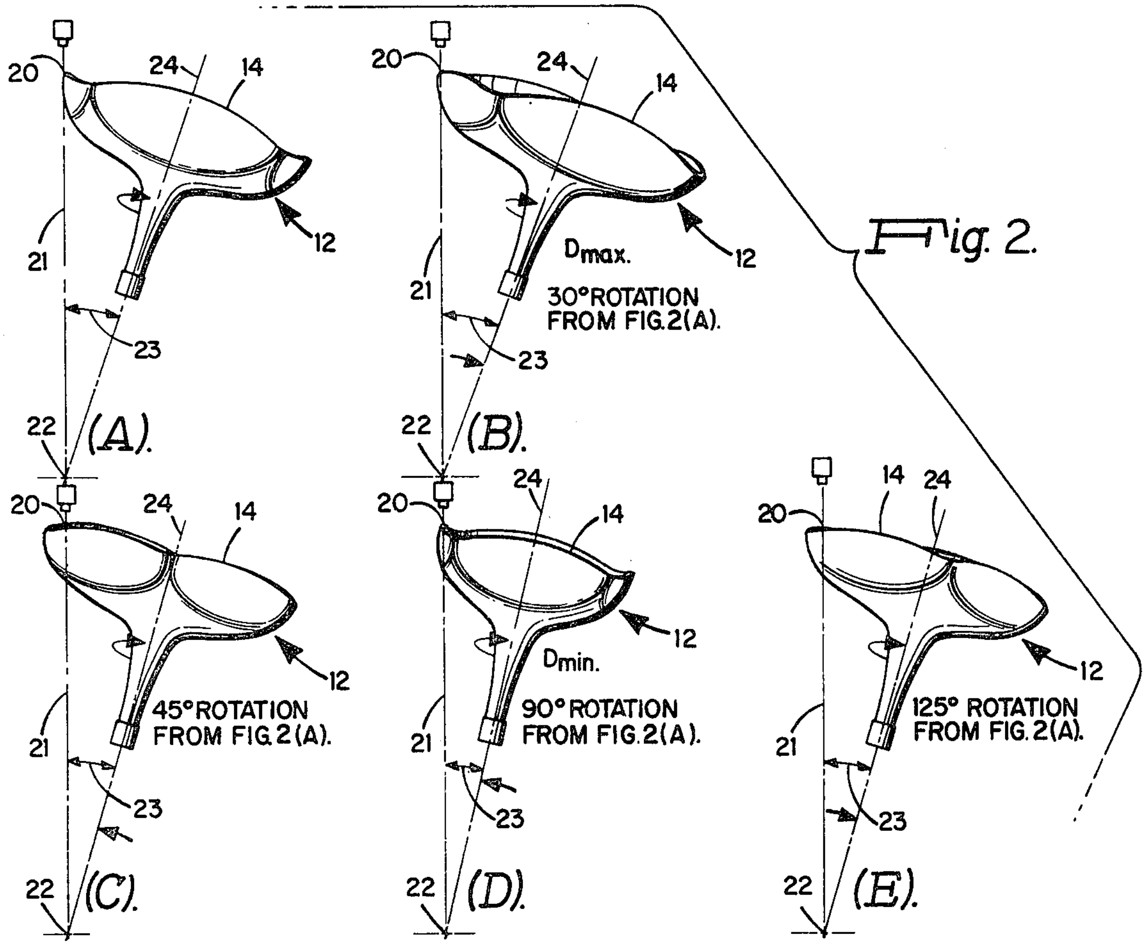
FIGS. 2A-2E are perspective views showing the FIG. 1 funnel in various rotated position and also showing the tilting of the funnel such that a section of the funnel seal land is always under a cement dispensing nozzle at a substantially constant predetermined distance and in a substantially horizontal attitude.

FIGS. 2A–2E illustrate a sequence of movements of the funnel 12 as it revolves about its central axis 24 and as it simultaneously swings back and forth, pivoting at the center 22 of the sphere 16. FIG. 3 is a plane view of the funnel 12. In FIG. 2A, the nozzle 20 is located approximately over the center of a short side of the funnel 12 at a point on the funnel seal land 14 indicated by the literal notation "2A" in FIG. 3. As the funnel 12 rotates counter clockwise approximately 30° to the position shown in FIG. 2B, a point on the funnel seal land 14 designated "2B" in FIG. 3 moves underneath the nozzle 20 and the tilt angle 23 formed by the central axis 24 with an imaginary fixed vertical line 21 increases. FIG. 2C shows the funnel 12 rotated approximately 45° from the funnel position shown in FIG. 2A. Here the angle 23 decreases as the seal land 14 moves beneath the nozzle 20. Point "2C" in FIg. 3 in now located under the nozzle 20. FIG. 2D shows the nozzle 20 at point "2D" over the center of the long side of the funnel 12 with the angle 23 being at a minimum. The rotation in FIG. 2D is approximately 90° from the position shown in FIG. 2A. Finally, FIG. 2E shows a rotation of approximately 125° from the position shown in FIG. 2A. Here angle 23 has increased to move the funnel axis 24 away from the nozzle 20 such that the seal land remains under the nozzle 20.

Due to the unique movement of the funnel 12, a section of the seal land 14 is always beneath the nozzle 20, and is always in a substantially horizontal attitude. This prevents the cement 15 from running off the seal land 14 until it has had a predetermined time in which to harden sufficiently to prevent run-off. In effect, the imaginary sphere 16 is rotated about axis 24 while simultaneously being rocked back and forth about its center 22. If a marking instrument were positioned at the location of the cement dispensing nozzle 20, a line would be drawn on the sphere 16 exactly corresponding to the seal land 14 of the funnel 12.

The invention involves a novel approach to the application of frit material or cement to the seal land of a glass funnel of a color television picture tube. Reiterating, the cement dispensing nozzle 20 is substantially stationary, and yet, due to the novel movement of the funnel, frit material can be efficiently and economically applied to the non-planar curved seal land of the funnel.

Figure 4:
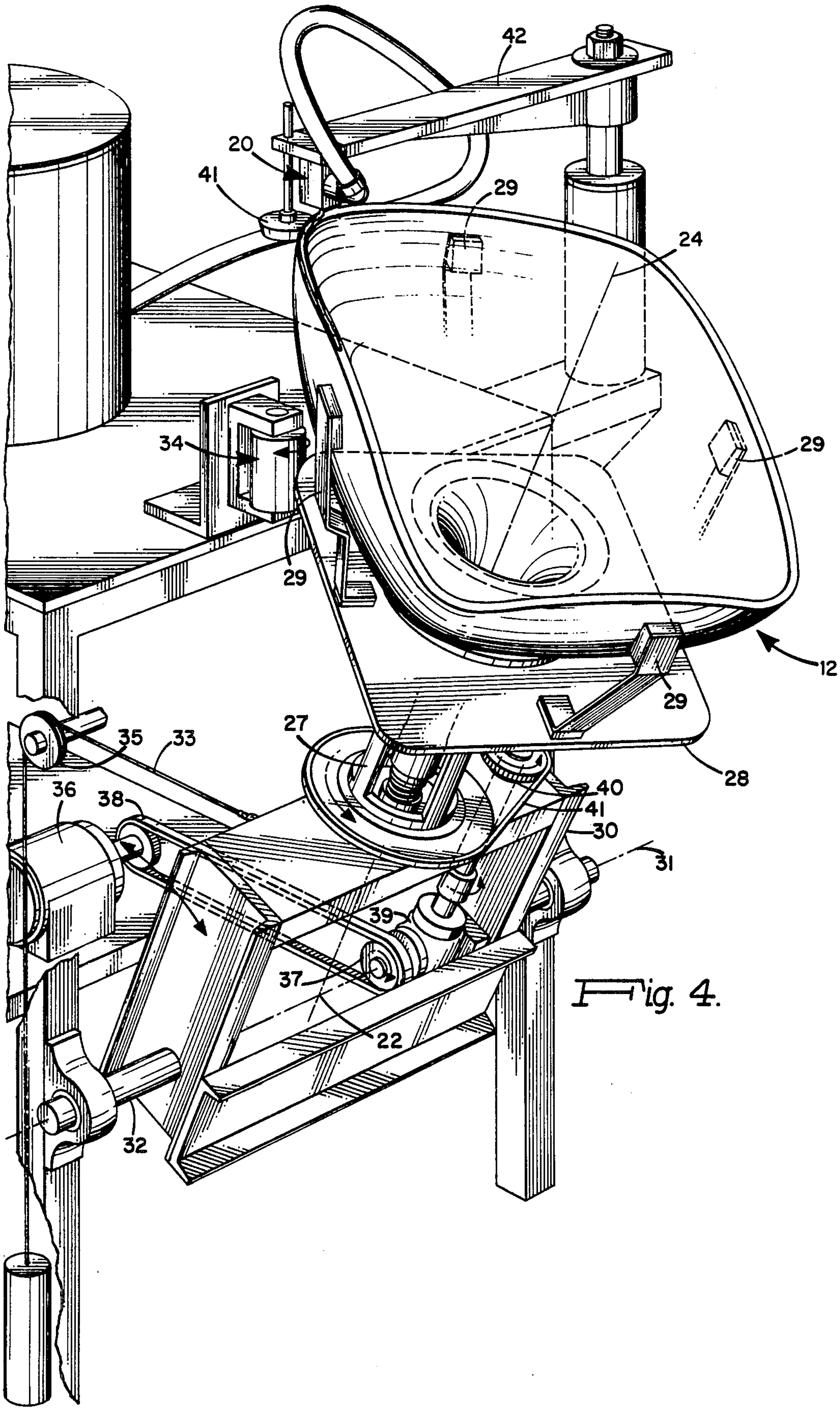
FIG. 4 is a perspective view of apparatus implementing the inventive method illustrated in FIGS. 2A-2E and 3 applied to the FIG. 1 funnel.

FIG. 4 illustrates a preferred embodiment of the invention. In the FIG. 4 embodiment, the funnel 12 is positioned on a holder comprising a base 27, cam plate 28 and padded arms 29 which is rotatably coupled to a frame 30 which can pivot about on axis 31, by means of a shaft 32. The axis 31 passes through and is transverse to the central axis 24 of the funnel 12 and also passes through the center 22 of the imaginary curved plane 16 defined by the seal land (the plane is not shown in FIG. 4). The cam plate 28 substantially corresponds in shape to the cross-sectional shape of the mouth of the funnel 12. The edge of this plate 28 rides against a roller 34 which is mounted in a stationary position with reference to axis 31. A constant tension is applied to the holder, as by means of weight-drawn wire 33 and pully 35 so that the plate 28 always remains in contact with the roller 34 as the funnel 12 and the plate 28 are rotated.

The rotation of the funnel 12 is caused by a motor 36 which drives base 27 through a belt 38, pulley 37, gear box 39, pulley 40 and belt 41 as illustrated in FIG. 4. The first component of motion, the swinging back and forth of the funnel 12, is effected by the movement of the cam plate 28 against the roller 34. A novel aspect of this invention is that the rotation of the funnel 12, the second components of motion, causes the first component of motion to occur.

The unique result of the two components of motion is to insure that the seal lane 14 passes beneath the cement dispensing nozzle 20 at a predetermined distance therebelow and in a substantially horizontal attitude. In order to operate smooth and efficiently, it is necessary to round off the corners of the cam plate 28 so that it can ride against the roller 34 without difficulty. This creates the necessity of allowing the cement dispensing nozzle 20 to move slightly, which is accomplished by a correction wheel 41, carried by a pivoted arm 42, which rides against the side of the funnel 12, and causes the cement dispensing nozzle 20 to remain over the center of the seal land 14. Another important function of the correction wheel 41 of pivoted arm 42 is to compensate for variations in the thickness of the glass wall of the funnel 12 due to manufacturing tolerances. The funnel motion program follows a cyclic sequence of four swing-swing-back movements synchronized with one complete revolution of the funnel.

An important aspect of this apparatus is that it can be quickly and efficiently adapted to different size funnels by raising or lowering the frame 30 and replacing the base 27, cam plate 28 and arms 29 with another size base, cam plate, and arms.

Figure 5:
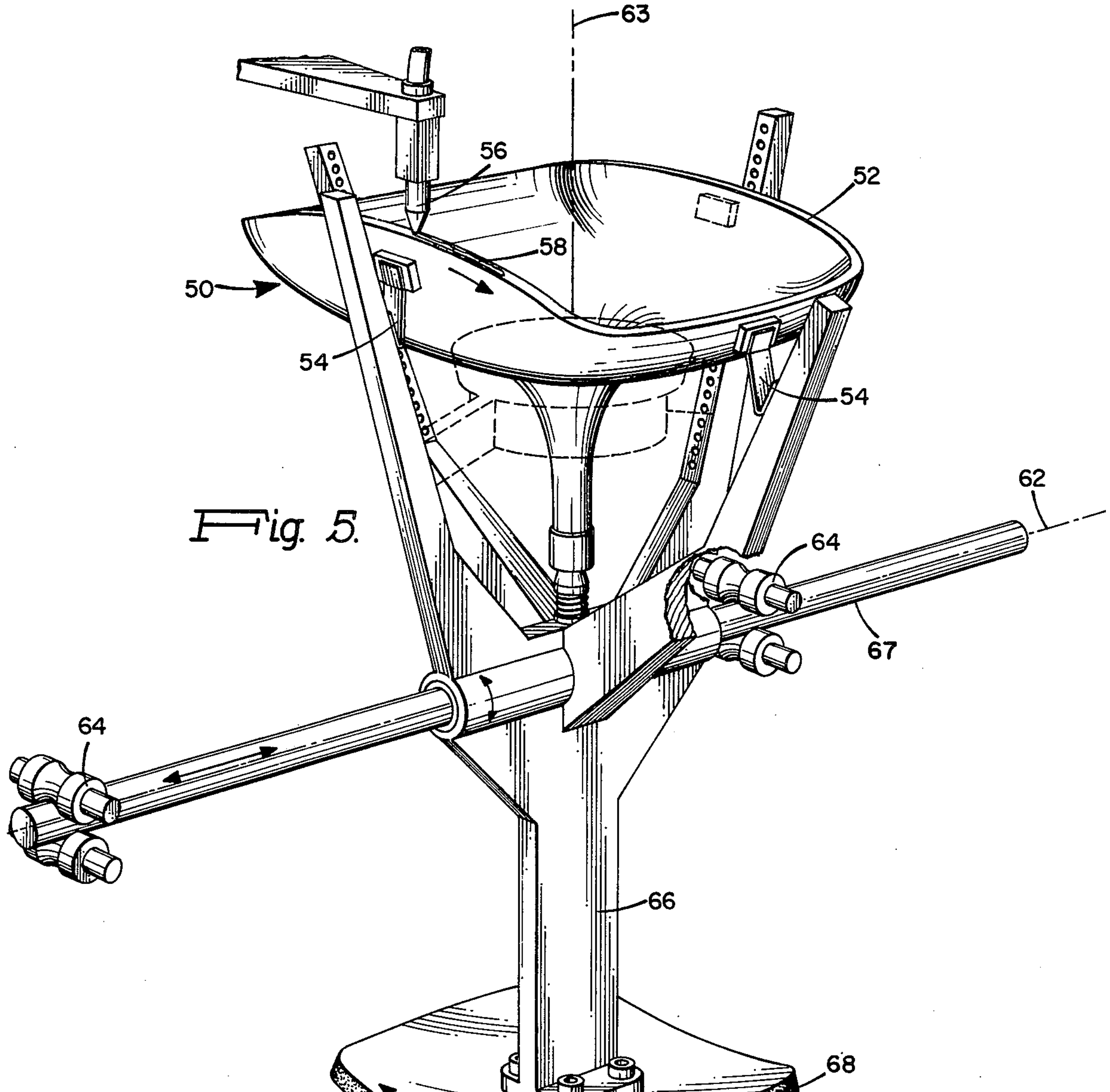
FIG. 5 is a perspective view of an alternative embodiment of the invention constructed to apply cement to a funnel seal land which defines a cylindrical convex curved plane.

This invention can also be used for the application of sealing cement to funnels which have seal lands of other curvatures than spherical or approximately spherical. An alternative embodiment is shown in FIG. 5 wherein the seal land 52 defines an imaginary cylinder. Here again, the novel movement for applying a cement 58 to a curved segment of the seal land 52 is to swing the funnel 50 about an axis 62 which is transverse to a funnel central axis 63 and which passes through the origin of the radius of the curved segment of the seal land 52. This unique movement of the funnel 50 keeps the seal land segment at a substantially constant distance beneath the cement dispensing nozzle 56 and in a substantially horizontal attitude. The funnel motion accomplished by this alternative embodiment is to translate the funnel 50 during the period the straight section of the seal land 52 is beneath the cement dispensing nozzle 56 and then swing the funnel 50 during the time the curved segment of the seal land 52 is beneath the cement dispensing nozzle 50. A cement dispensing program is established following the sequence: Swing, translate, swing-back, translate-back. The principle for applying cement to a curved segment is the same for the funnel 50 as for the funnel 12 with the spherical seal land 14. It is again necessary to have two components of motion wherein one of the components is a swinging the funnel on an axis which is transverse to the central axis of the funnel and which passes through the origin of the radius of the curved segment.

In the alternative embodiment illustrated in FIG. 5, the funnel 50 is positioned on a holder 54 which is attached to a frame 66. The frame 66 is able to pivot about shaft 67. Attached to the lower end of frame 66 is a plate 68 which substantially corresponds in shape to the cross-sectional shape of the mouth of the funnel 50. The edge of this plate 68 rides against a roller 70 which is mounted in a stationary position with reference to the shaft 67. A constant tension is applied to the plate 68 so that it remains in contact with the roller 70. A motor 74 causes the funnel 50 to pivot about shaft 67 so that the curved segment of the seal land 52 moves beneath the frit dispensing nozzle 56 at a predetermined distance and in a substantially horizontal attitude. In order to apply the cement 58 to the straight planar section of the seal land 52, another motor (not shown) moves the entire assembly on shaft 67 by means of driver rollers 64. As stated, the resulting cement dispensed program follows a cyclic sequence of swing, translate, swing-back, translate-back.

Figure 5A:
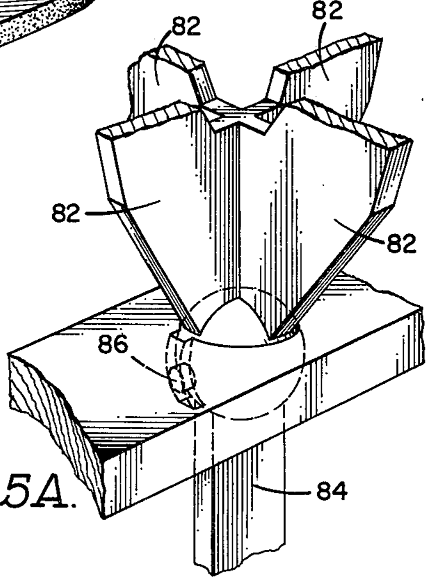
FIG. 5A is a perspective view of apparatus for adapting the FIG. 5 apparatus for use with a funnel as shown in FIG. 1.

FIG. 5A shows a keyed gimbal structure with which the FIG. 5 embodiment could be adapted to accommodate a funnel with a spherical, or approximately spherical seal land, as illustrated in FIG. 1. The FIG. 5A gimbal structure would replace shaft 67, rollers 64, and the drive motor for reciprocating the shaft 64 in the FIG. 5 embodiment. The driver wheel 70 would be located beneath the gimbal, and the plate 68 would necessarily have a different edge configuration.

The invention is not limited to the particular details of construction of the embodiment depicted and other modifications and applications are contemplated. Certain changes may be made in the above-described method and apparatus without departing from the true spirit and scope of the invention herein involved. It is intended therefore that the subject matter in the above-depiction will be interpreted as illustrative and not in a limiting sense.

What is claimed is:

1. In the manufacture of a color cathode ray tube including a faceplate and a mating funnel, the funnel having a seal land defining a convex curved plane, with at least a curved segment of said funnel seal land lying on a predetermined radius, a method for dispensing a cement onto said segment of the seal land of the funnel, comprising:

holding the funnel such that a section of said seal land segment is substantially horizontal and upwardly facing for preventing cement run-off;

providing a substantially stationary cement dispensing nozzle in position over said substantially horizontal section of said seal land segment for applying cement to said seal land; and in order to dispense cement on the entirety of said segment, swinging the funnel about an origin of said radius of said seal land segment of the funnel such that said segment passes under the cement dispensing nozzle at a substantially constant predetermined distance beneath the nozzle and in a substantially horizontal attitude.

2. In the manufacture of a rectangular type color cathode ray tube including a faceplate and a mating funnel, the funnel having a seal land defining a convex curved plane with at least a curved segment of said funnel seal land lying on a predetermined radius, a method for dispensing a cement onto said segment of the seal land of the funnel, comprising:

holding the funnel such that a section of said seal land segment is substantially horizontal and upwardly facing for preventing cement run-off;

positioning a substantially stationary cement dispensing nozzle over the substantially horizontal section of said seal land segment for applying cement to the seal land; and in order to dispense cement on said seal land of the funnel, moving the funnel with at least first and second components of motion wherein said first component of motion is a swinging of the funnel on an axis which is transverse to a central axis of the funnel and which passes substantially through the origin of the radius of said curved segment of the seal land of the funnel such that said curved segment passes under the cement dispensing nozzle at a substantially constant predetermined distance beneath the nozzle and in a substantially horizontal attitude.

3. The method defined in claim 2, wherein said convex plane defined by said funnel seal land is substantially spherical such that the center of the sphere lies on the central axis of the funnel, and said seal land having four curved segments, and wherein said second component of motion is a revolving of the funnel about central axis of the funnel while the funnel is swung and synchronized such that the seal land passes under the cement dispensing nozzle at a substantially constant predetermined distance beneath the nozzle and in a substantially horizontal attitude, the cement dispense program following a cyclic sequence of four swing-swing-back movements synchronized with one complete revolution of the funnel.

4. In the manufacture of a rectangular-type cathode ray tube which includes a faceplate and a mating funnel, the funnel having a seal land defining a convex spherical or approximately spherical curved plane, whose radius originates at a point on the central axis of the funnel, a method for dispensing a sealing cement onto said seal land of the funnel, comprising:

providing a cement dispensing nozzle for issuing on comman a continuous stream of cement; and holding the funnel roughly upright but tilted through a tilt angle effective to dispose a predetermined section of the seal land in a horizontal attitude above said point; and locating said funnel such that said point representing the origin of the radius of the curved plane defined by the seal land is distantly below said nozzle and said seal land section is immediately below said nozzle; and dispensing a stream of cement from said nozzle onto said seal land and simultaneously therewith rotating said funnel about its central axis while varying said tilt angle of the funnel so as to maintain the moving seal land in position beneath said nozzle and in a substantially horizontal attitude.

* * * * *